Dec. 6, 1966  C. W. FUNK ETAL  3,289,605
POWER TRANSMISSION

Filed Dec. 31, 1964  2 Sheets-Sheet 1

INVENTORS
CHARLES W. FUNK
HAROLD R. WARD
BY
ATTORNEYS

3,289,605
POWER TRANSMISSION
Charles W. Funk, Garden City, and Harold R. Ward, Pontiac, Mich., assignors to Sperry Rand Corporation, Troy, Mich., a corporation of Delaware
Filed Dec. 31, 1964, Ser. No. 422,653
7 Claims. (Cl. 103—162)

This invention relates to power transmissions and is particularly applicable to those of the type comprising two or more fluid pressure energy translating devices, one of which may function as a pump and another as a fluid motor.

This invention is generally concerned with variable displacement fluid pumps of the pressure compensated type and is more particularly concerned with an improved system for utilization with such pumps which is adapted, at starting, to permit the prime mover for driving the pump, such as an electric motor, to come up to rated speed at a substantially reduced torque requirement. The improved system may be used with any pressure compensated, variable displacement pump wherein mechanism for varying pump displacement is normally maintained in maximum displacement position and which is fluid-pressure actuated at predetermined increases of pressure at the outlet, as determined by a compensator control valve setting, to reduce the displacement to zero or substantially zero displacement.

There are many hydraulic machine tool applications, one example being a hydraulic drive for transfer machines wherein an electric motor prime mover of a given horsepower may be more than adequate to drive the pump at low pressure, full volume during a rapid advance phase of a cycle and also at a relatively higher pressure, low volume or substantially zero displacement during another phase of the cycle but which is temporarily inadequate at starting to bring the pump up to rated speed at full stroke in a closed-center system wherein a relatively high pressure determined by the compensator control valve setting must be reached before the stroke of the pump is decreased to reduce its displacement. In such instances, the electric motor is overloaded at start up and in many cases is unable to start the pump unless the compensator control valve is manually adjusted to decrease the pressure setting at starting and then, when rated speed of the motor has been reached, to increase the compensator control valve setting to its proper system setting.

In conventional pressure compensated, variable displacement pumps, the hydraulic force needed to shift or actuate the mechanism for varying the displacement of the pump, which mechanism in the case of rotary axial piston pumps is usually a spring-backed compensator piston connected to a thrust plate or yoke, is relatively low in comparison to the hydraulic force needed to shift the compensator valve in order to admit pressure from the outlet side of the pump to the compensator piston. The improved system is adapted to co-act with conventional compensator valve and compensator piston pump systems by temporarily, at starting of the pump, connecting the outlet side of the pump not only to the compensator valve but also directly to the compensator piston and shifting the latter at relatively low pressure to bring the pump to zero stroke. In a closed-center hydraulic system, when the stroke of the pump has been reduced to substantially zero, the immediate pressure buildup actuates the bypass valve in the improved system to make it ineffective and permits actuation of the compensator valve at a relatively high pressure which has been reached, however, at reduced stroke of the pump. Then, when the prime mover is at the rated speed and with full pressure in the system, when the closed-center valving in the machine tool drive is opened, the pressure drops to a level lower than the compensator valve setting and the compensator valve operates as normally to permit the compensator piston to return the pump to full, maximum displacement, stroke. The bypass valve system is only effective at starting of the prime mover and pump and gets completely out of the way, so to speak, once the prime mover has coasted over the torque peak during transition.

The improved system may be incorporated in a modified housing in which the compensator control valve may also be shiftably mounted, or it may preferably be mounted in a separate housing or valve block adapted to be mounted on the same mounting surface of conventional pressure compensated, variable displacement pumps on which would be normally mounted the conventional pressure compensating mechanism for controlling admission of outlet supply pressure to the pressure actuated mechanism for varying the displacement of the device. In such case, the conventional compensator valve housing is mounted on a mounting surface of the housing incorporating the improved system, such housing being provided with a mounting surface having passages opening thereto conforming to the passage openings on the mounting surface of the conventional pump housing.

Thus, in a rotary axial piston pump of the pressure compensated type wherein the valve plate is rotated to vary the displacement of the device, such as disclosed in Patent No. 3,108,542, a separate housing in which is incorporated the improved system may be mounted on the surface normally occupied by the conventional pressure compensating valve housing and the conventional pressure compensating valve housing is mounted on the housing which incorporates the improved bypass system. In another type of pressure compensated, variable displacement pump, such as disclosed in Patent No. 2,530,242, wherein the compensator valve housing is mounted on a surface of the housing having passages leading directly to the compensator piston for shifting the yoke of rotary axial piston pump mechanism, the housing incorporating the improved system may again be placed on the pump housing on the mounting surface normally occupied by the compensator valve housing and having passages leading to the compensator piston, and the compensator valve housing may be mounted on the housing incorporating the improved system. In another form of pressure compensated, variable displacement, rotary axial piston pump, wherein the angle of a thrust plate against which the pistons abut is changed to vary displacement, such as the Vickers Incorporated Model No. PVB20 which incorporates in-line pumping mechanism of the type disclosed in Patent No. 2,776,628, the housing incorporating the improved system may be substituted for the compensator valve housing in the same manner as explained for the pump disclosed in Patent No. 2,530,242.

Thus, savings and manufacturing costs and consequently reduction in the sales price may be accomplished by incorporating the improved system in a housing adapted to be mounted on the housings, without modification, of conventional pressure compensated, variable displacement pumps. In systems not requiring a reduced torque at starting of the motor, the conventional pressure compensated, variable displacement pump may be utilized; and when the system application requirements are such that a reduced pressure or torque at starting is essential, the improved system may be mounted directly on the conventional pump housing without any other modification being necessary of such pump.

It is, therefore, an object of this invention to provide an improved bypass system for use with pressure compensated, variable displacement pumps.

It is another object to provide an improved bypass system for use with pressure compensated, variable displacement pumps which is adapted to substantially reduce the pump prime mover starting torque requirements, particularly in hydraulic drives of the closed-center type.

It is another object of this invention to provide an improved system for the aforementioned purposes comprising all necessary valving, passages, and porting which are incorporated in a housing which may be mounted on a conventional variable displacement pump of the pressure compensated type.

It is still another object of this invention to provide an improved bypass system which is automatically effective only at starting of a pump of the type aforementioned and which then becomes ineffective to permit the pump to operate in all respects as a normal pressure compensated pump.

It is still another object of this invention to provide an improved bypass system for the purposes aforementioned which may be mounted on conventional variable displacement pumps of the pressure compensated type, wherein the casing of the pump and pumping mechanism and pressure actuated displacement varying mechanism thereof may be substantially the same as in conventional devices of this type.

A further object of this invention is to provide a two-section pressure compensator and bypass valve manifold housing, one of which contains a pressure compensator valve for controlling actuation of a compensator piston adapted to vary displacement of the pump mechanism, and the other section of which contains all valving, passages, and porting necessary to accomplish the reduced torque starting purposes aforementioned, both sections of which may be utilized on the pump housing where it is necessary to reduce starting torque needed to bring the pump up to full speed, and wherein the other section containing the pressure compensator valve may be utilized when the starting torque requirements are substantially lower.

Further objects and advantages of the present invention will be apparent from the following description, reference being had to the accompanying drawings wherein a preferred form of the present invention is clearly shown.

Figure 2:
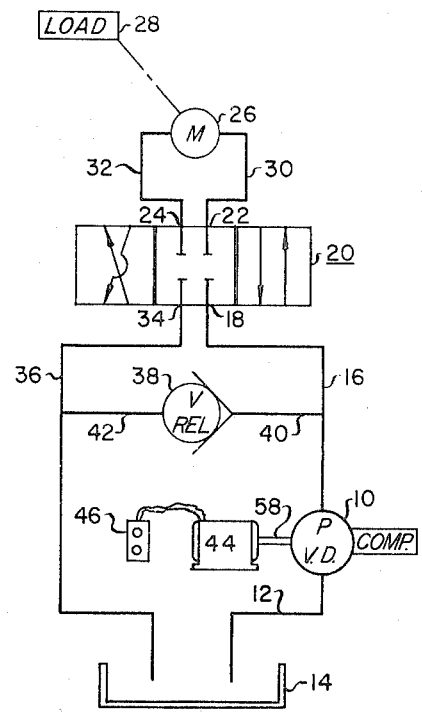
FIGURE 2 is a diagrammatic view of a hydraulic power transmission system including a fluid pump of the type shown in FIGURE 1 and employing a preferred form of the present invention.

Referring now to FIGURE 2, there is shown a hydraulic power transmission for driving a load device, comprising a fluid pump 10 connected at its inlet side by a conduit 12 to a reservoir 14 and connected at its outlet side by a pressure delivery conduit 16 to a pressure port 18 of a directional control valve 20 of the closed-center type. The control valve 20 is provided with motor ports 22 and 24 which are connected to opposite sides of a fluid motor 26 for driving a load device 28 by conduits 30 and 32. A return port 34 of control valve 20 is connected by a return conduit 36 to the reservoir 14 Although not essential, a relief valve 38 may be incorporated in the system as an additional safety factor and may be connected by a branch conduit 40 to the pressure supply conduit 16 and connected by an exhaust conduit 42 to the return conduit 36. The relief valve setting will, of course, be higher than the setting of the compensator valve to be described later. An electric motor 44 is mechanically coupled to the pump 10 for driving the same and is started by means of a button switch, indicated by the numeral 46. In the system disclosed, at starting of the pump, the directional control valve 20 will be in the closed-center position, that is, all ports will be blocked from communication from each other. The control valve 20 may be operated by any suitable means to positions on opposite sides of the closed-center position for connecting the pressure port to one of the motor ports and the remaining motor port to the tank port for operating the load device in opposite directions.

Figure 1:
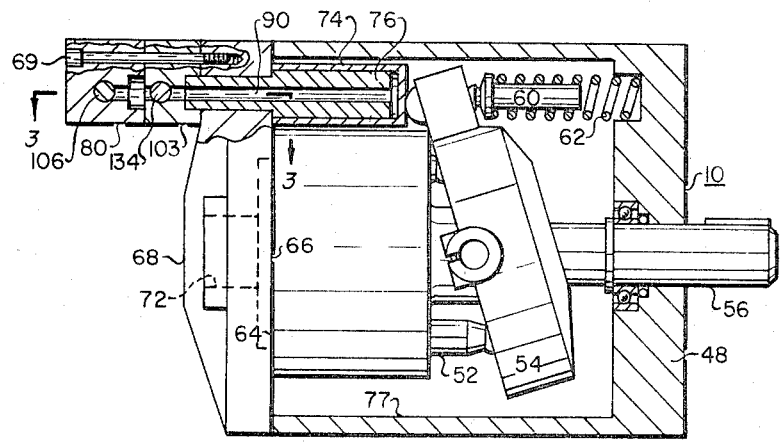
FIGURE 1 is a view partially in section, of a rotary, axial piston fluid pump of the variable displacement, pressure compensated type and embodying a preferred form of the present invention.

The pump 10 may be a conventional rotary, axial piston, variable displacement, pressure compensating type, as shown in FIGURE 1, comprising a housing 48 having rotatably mounted therein a cylinder barrel 50 with a plurality of parallel bores, each of which has a piston 52 reciprocable therein. The pistons 52 may be provided with shoes, not shown, which abut and slide against a thrust plate maintained in a yoke 54 which is shiftable to change the stroke of the pistons and thus vary the displacement of the pump. The cylinder barrel 50 is spline-connected to a shaft 56 for driving the same, the shaft 56 in turn being mechanically coupled to the electric motor, as indicated at 58 in FIGURE 2. The yoke 54 may be pivotally mounted on pintles, not shown, and maintained normally at the maximum displacement angle shown by a piston 60 backed by a light spring 62.

Rotary axial piston pumps of this type are provided with cylinder ports, not shown, opening to a face of the barrel, indicated by the numeral 64, which is maintained in rotary fluid sealing engagement with an opposing face of a valve plate face, indicated by the numeral 66, formed in a pump head or cover member, indicated by the numeral 68, which will have inlet and outlet terminal ports located on a face of the cover and which is suitably bolted to the casing 48. As the cylinder barrel rotates, the cylinder bores having pistons on a suction stroke will take in fluid from an inlet passage through the valve plate inlet port and the pistons on a discharge stroke will force fluid out of their bores into the valve plate outlet port and outlet passage, said inlet and outlet passages being indicated in FIGURES 3 and 4, respectively, by the numerals 70 and 72.

As shown in FIGURE 1, the yoke 54 is normally maintained by the spring-backed piston 62 at an angle adapted to provide maximum stroke of the cylinder barrel pistons and thus maximum displacement of the device. When a compensator piston 74, slidable on a piston guide 76, located in a bore 77 of pump housing 48, is pressure actuated rightwardly, as viewed in FIGURE 1, the angle of the yoke will be decreased to decrease the stroke of the pistons and thus the displacement of the device. When the yoke has been shifted to a position perpendicular to the shaft axis, the piston stroke and displacement of the device will be zero.

Figure 3:
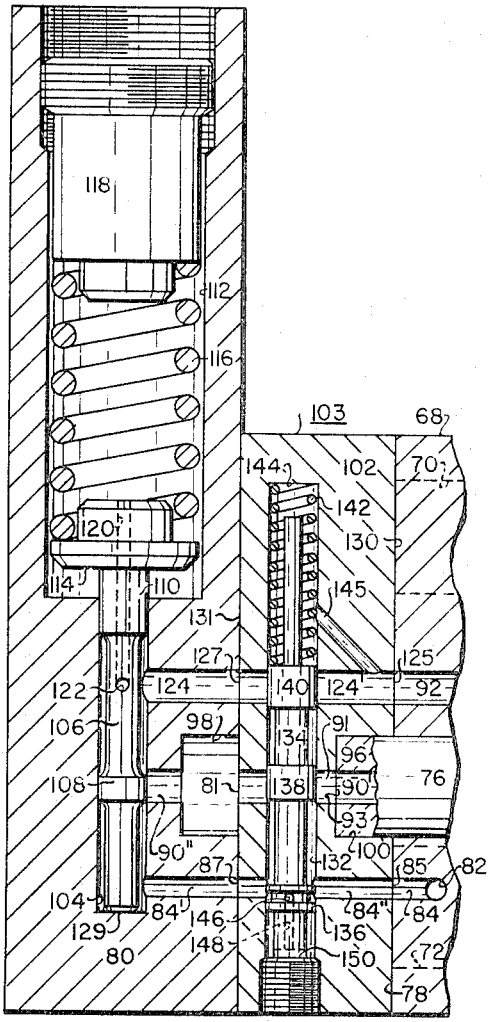
FIGURE 3 is a partial, sectional view taken on line 3—3 of FIGURE 1.
Figure 4:
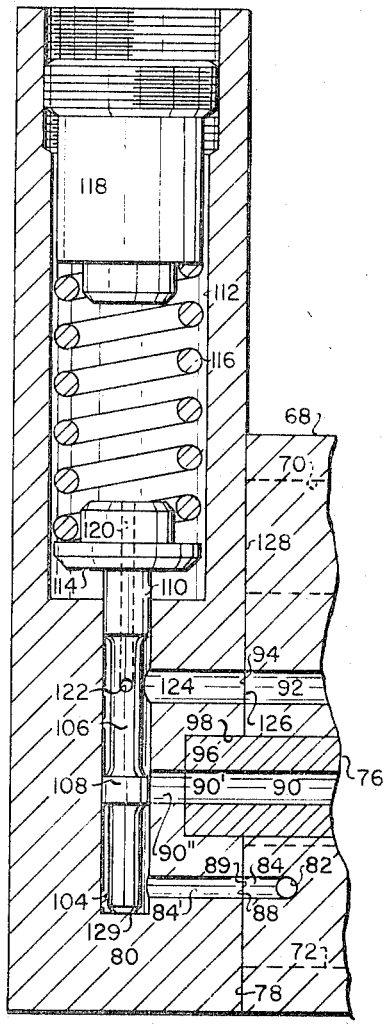
FIGURE 4 is a view illustrating the conventional mounting arrangement of the same compensator control valve and on the same pump housing, shown in FIGURES 1 and 3, wherein the bypass valve system comprising a preferred form of the present invention is not utilized with the pump.

The housings or casings of conventional pumps of the type disclosed are provided with a mounting surface for a pressure compensator valve housing, the casing, pressure compensator valve housing mounting surface of the casing and the pressure compensator valve housing being indicated in both FIGURES 3 and 4, respectively, by the numerals 78 and 80.

Connected to the pump casing outlet passage 72 are branch outlet passages 82 and 84, the latter of which has an opening, indicated by the numeral 88 on the mounting surface 78 of the casing. The casing is also provided with a pressure delivery passage 90 formed within the piston compensator guide 76 and also provided with a low pressure vent passage 92 connected to the interior of the casing which has an opening 94 on the casing mounting surface 78. Although an opening for the pressure delivery passage 90 could be formed on the mounting surface, the piston guide 76, instead, is provided with an extension 96 mounted in a bore 98 of the compensator valve housing 80, as shown in FIGURE 4, or which is mounted in a similar bore 100 of a housing 102 of a bypass valve 103, as indicated in FIGURE 3, the extension of the outlet passage 90 in the extended portion 96 of the piston guide, being indicated by the numeral 90'. Passage 90' registers with a passage 90'' extending from the valve bore 104.

The compensator valve housing 80, illustrated in FIGURES 3 and 4, is provided with a stepped bore within the smaller diameter portion of which, indicated by the numeral 104, is shiftably mounted a compensator control valve spool 106 having a land 108 for controlling communication of outlet passage 84 with the continuous pressure delivery passage 90'', 90', and 90 leading to the compensator piston for shifting the yoke and is also provided with a guide land 110 at its opposite end. In the position shown of compensator spool 106, land 108 permits communication between passage 90'' and vent passage 124. Located within the enlarged portion of the stepped bore and which forms a spring chamber 112 is a flanged spring retainer portion 114 of the compensator control valve which is engaged by a spring 116, the opposite end of which engages a bore closure member 118. The spring chamber 112 is adapted to be continually vented to the interior of the casing of the pump by a longitudinal passage 120 extending from the flanged end 114 of the compensator valve spool 106 to a plurality of transverse ports 122 which are in communication with the vent passage opening 94 on the casing cover mounting surface 78 by means of a vent passage 124 in the compensator valve housing extending from bore 104 to an opening 126 on a mounting surface 128 of the compensator valve housing.

The pressure compensator control valve is adapted to automatically adjust pump delivery to maintain system flow requirements. The high pressure outlet side of the pump is continually connected to a pressure effective surface area 129 at the lower end of spool 106, as viewed in FIGURES 3 and 4, by means of an outlet passage 84' leading from the lower end of the bore 104 to an opening 89 on mounting surface 128 which registers with opening 88 on the cover mounting surface 78. Maximum pump delivery will be maintained to a pressure slightly below the adjustable setting of the spring 116, and when this setting is reached, the compensator valve spool is shifted upwardly, as viewed in FIGURES 3 and 4, to connect the outlet side of the pump to the compensator piston 74 for shifting the yoke of the pump thus reducing its output and maintaining a preset pressure. It should be noted that although a relatively high pressure, for example, 1,000 p.s.i. is required to overcome spring 116, only 100 p.s.i. or less is required for shifting the compensator piston, a drop in pressure occurring across the metering land 108 of the compensator spool 106.

In closed-center systems, such as illustrated in FIGURE 2, when it is desired to reduce the high pressure or torque requirement of the prime mover at starting of the pump, because the pump must be started at full stroke against the high pressure spring setting of the compensator valve, instead of mounting the compensator valve housing 80 directly on the mounting surface 78 of the pump casing cover, as shown in FIGURE 4, the bypass valve housing 102 is mounted directly on the mounting surface 78 of the casing cover in place of the compensator valve housing 80. As shown in FIGURE 3, the bypass valve housing 102 is provided with passages having openings on a mounting surface 130 adapted to cooperate with the openings on mounting surface 78 of the pump casing cover in the same manner as the mounting surface 128 of the compensator valve housing, while the compensator valve housing is mounted on the bypass valve housing which has passages extending to an opposed mounting surface adapted to cooperate in the same manner as the casing passages in the conventionl system shown in FIGURE 4. The compensator valve and bypass valve housings may be suitably fastened to the cover 68 by screw members 69 threaded into the pump cover 68.

Shiftably mounted in a longitudinal bore 132 of the bypass valve housing 102 is a bypass valve spool 134 having spaced-apart lands 136, 138, and 140 for controlling three passages which extend from the mounting surface 130 to an opposed surface 131 on which the compensating valve housing is mounted and all of which intersect the valve bore 132. These passages are a branch outlet passage 84'' controlled by land 136, a pressure supply passage 91, and a vent passage 124' respectively, controlled by lands 138 and 140. Passage 84'' has an opening 85 on mounting surface 130 which is adapted to register with opening 88 of the cover passage 84 and an opening 87 on surface 131 which registers with opening 89 of passage 84' on mounting surface 128 of the compensator valve housing 80. Pressure supply passage 91 is provided with an opening 93 adapted to register with compensator piston passage 90' and an opening 81 on mounting surface 131 which communicates with the bore 98 of the compensator valve housing in which the compensator piston guide would normally be mounted. Vent passage 124' has an opening 125 on mounting surface 130 registering with opening 94 of cover vent passage 92 on mounting surface 78 thereof and has an opening 127 registering with opening 126 of passage 124 of the compensator valve housing on mounting surface 128 thereof.

Bypass valve spool 134 is biased to the position shown permitting communication between branch outlet passage 84'' and pressure delivery passage 91 leading to the compensator piston by means of a light spring 142 mounted in a spring chamber 144 at the upper end of bore 132. Spring chamber 144 is vented to the vent passage 124' by a cross passage 145.

Grooved land 136 of bypass valve spool 134 is provided with a plurality of transverse ports 146 to which is connected a longitudinal passage 148 for the purpose of connecting branch outlet passage 84'' to a pressure effective end surface 150 of valve spool 134. The hydraulic force required to shift valve spool 134 is adapted to be slightly more than required to overcome the spring bias of the compensator piston but much less than that required to shift the compensator valve spool.

In a conventional variable displacement pressure compensated pump, as illustrated in FIGURE 4, the yoke 54 will remain in the position shown in FIGURE 1 for providing maximum stroking of the pistons and thus maximum displacement of the device until a pressure is reached sufficient to overcome the compensator valve spring 116. When the relatively high pressure has been reached, for example, 1,000 p.s.i. or slightly less, the spool 106 will be shifted upwardly to connect the outlet side of the device to the compensator piston 76 by means of outlet passage 72, branch outlet passages 82 and 84, openings 88 and 89 on mounting surfaces 78 and 128 thereof of the pump cover and compensator valve housing, passage 84', bore 104, and pressure passage 90'', 90', and 90. Pressure fluid from the outlet side of the device is metered across land 108, a drop in pressure taking place thereacross, to actuate the compensator piston and thus shift the yoke to decrease the stroke of the pistons and thus decrease the displacement of the device. When pressure decreases below the bias of spring 116, the spring 116 shifts the spool 106 downwardly and the compensator piston spring 62 and piston 60 shifts the compensator valve spool 106 back to a position blocking communication between the outlet side of the pump and the compensator piston and opening passage 90" to vent passage 124 permitting spring 62 to actuate the compensator piston 60 and thus shift the yoke 54 back to the maximum displacement position shown in FIG. 1. Under these circumstances then, at starting, the electric motor must bring the pump up to full speed with the pistons initially at maximum displacement stroking position and must work against the relatively high pressure setting of the compensator valve spring in order to decrease the displacement before the torque requirement could be lowered.

In order to relieve the electric motor of the high torque starting requirement in a closed-center system, such as illustrated in FIGURE 2, the improved bypass valve system may be utilized by mounting the bypass valve housing, shown in FIGURE 3, on the mounting surface 78 normally occupied by the compensator valve housing 80 and mounting the compensator valve housing on the bypass valve mounting surface 131. In such case, when the pump is started in the closed-center system, the outlet side of the pump is connected directly to the compensator piston 76 by means of outlet passage 72, branch outlet passages 82 and 84, opening 88 on mounting surface 78, opening 85 on mounting surface 130 of the bypass valve housing, branch outlet passage 84", bore 132, across land 138 to passage 91, and by means of opening 93 to the pressure supply passage 90' and 90 leading to the compensator piston 74. The compensator piston 74 is actuated at a low pressure, as determined by the light spring bias of spring 62, to shift the yoke of the pump to its minimum displacement position. As the electric motor comes up to speed, it must only work against a slight pressure sufficient to overcome the low setting of the compensator piston spring 62 rather than the relatively higher pressure setting of the compensator valve spring as in the conventional system, shown in FIGURE 4. At the same time, outlet pressure has been transmitted by transverse ports 146 and longitudinal passage 148 in bypass valve spool 134 to the pressure effective surface 150 of the bypass valve spool and by means of passage 84", opening 87 on opposed mounting surface 131, and passage 84' of the compensator valve housing to the pressure effective surface 129 of compensator valve spool 106. As the pressure increases, the bypass valve spool 106 is actuated against a stop to move the same out of the system, land 136 of the bypass valve spool now blocking communication between branch outlet passage 84" and the compensator piston passage 90' and 90, and the pump will operate as a normal pressure compensated pump. The electric motor has been brought up to rated speed against low pressure and reduced stroke of the pistons, but because of the closed-center system, the pressure continues to increase and the compensator valve is actuated at high system pressure to connect the outlet side of the pump across land 108 of the compensator valve to the continuous pressure passage 90", 90', and 90, and land 140 of the bypass valve spool being shifted out of the way to connect vent passage 124 through the bypass valve housing to the vent passage 92 in the cover.

When directional control valve 20 is operated to connect the outlet side of pump 10 to motor 26, system pressure drops below the setting of the compensator valve spring 116 and the compensator piston 60, by action of spring 62, returns the pump to full stroke. The bypass valve continues to stay out of the system and does not interfere in any manner with operation of the system, the operation now being the same as with any conventional pressure compensated, variable displacement pump.

While the form of embodiment of the invention as herein disclosed constitutes a preferred form, it is to be understood that other forms might be adopted, all coming within the scope of the claims which follow.

What is claimed is as follows:

1. In combination with a fluid pump having fluid pressure operated mechanism for varying the displacement of the pump normally biased to a maximum displacement position, and a compensator control valve normally biased to a position closing the outlet side of the pump from the displacement varying mechanism and operable by pump fluid outlet pressure relatively higher than required to actuate the displacement varying mechanism to connect the outlet side of the pump to said mechanism for decreasing pump displacement: a fluid pressure actuated compensator bypass valve biased at starting of said pump to a position connecting the outlet side of the pump directly to the displacement varying mechanism for decreasing pump displacement and operable to another position, after the pump has been brought up to operating speed, by pump outlet fluid pressure lower than required to operate the compensator control valve to close direct communication between the outlet side of the pump and the displacement varying mechanism, said compensator bypass valve after said pump has been brought up to operating speed being adapted to remain in such other position and permitting the pump to operate in conjunction with the compensator control valve, as a normal pressure compensated, variable displacement pump.

2. In combination with a fluid pump driven by a prime mover including selectively operable start and stop means, said pump having fluid pressure operated mechanism for varying the displacement of the pump normally biased to a maximum displacement position, and a compensator control valve normally biased to a position closing the outlet side of the pump from the displacement varying mechanism and operable by pump fluid outlet pressure relatively higher than required to actuate the displacement varying mechanism to connect the outlet side of the pump to said mechanism for decreasing pump displacement: a fluid pressure actuated compensator bypass valve biased when the prime mover is stopped to a position connecting the outlet side of the pump directly to the displacement varying mechanism for decreasing pump displacement when the prime mover is started, said bypass valve being operable by pump outlet fluid pressure lower than required to operate the compensator control valve to another position closing direct communication of the outlet side of the pump with the displacement varying mechanism after said mechanism has been actuated to reduce displacement of said pump, said compensator bypass valve being adapted to remain in such other position and permitting the pump to operate in conjunction with the compensator control valve as a normal pressure compensated, variable displacement pump.

3. In combination with a variable displacement fluid pump of the pressure compensated type wherein at starting of said pump, a fluid pressure actuated mechanism for varying the displacement of the pump is in maximum displacement position and a fluid pressure actuated compensator control valve connected to the outlet side of the pump and the displacement varying mechanism is biased to a position closing communication therebetween, said compensator valve being operable at a predetermined pump outlet system pressure to open communication therebetween for reducing displacement of the pump: a fluid pressure actuated compensator bypasss valve connected to the outlet side of the pump and to said displacement varying mechanism and biased at starting of said pump to a position permitting open communication therebetween for reducing the displacement of said pump at a pressure lower than the compensator valve system setting, said bypass valve being operable by pump outlet pressure higher than the pressure required to operate the displacement varying mechanism to a position wherein direct communication between the pump outlet and displacement varying mechanism is closed, said bypass valve being maintained in said closed communication position and being ineffective during operation of said pump after starting for permitting said pump to operate as a normal pressure compensated, variable displacement pump.

4. In combination with a variable displacement, pressure compensated fluid pump of the type wherein a pressure compensator valve, operable within a housing removably mounted on the casing of the pump, is hydraulically connected to the outlet side of the pump and to pressure actuated mechanism for varying the displacement of the pump which is biased to the maximum displacement position, said control valve being operable at a relatively high pump outlet pressure to connect the outlet side of the pump to the said mechanism for reducing displacement of the pump, said mechanism being operable to reduce displacement at a relatively lower pressure than required to operate the compensator control valve:

a compensator bypass valve operable within a housing removably mounted on the pump casing in place of the compensator valve housing, said bypass valve also being hydraulically connected to the outlet side of the pump and to the displacement varying mechanism and biased to a position forming direct communication therebetween for reducing pump displacement at starting thereof;

a mounting surface on the bypass valve housing for the compensator control valve housing, said bypass valve housing having passages opening to said mounting surface for connecting the outlet side of the pump and the variable displacement mechanism to the compensator control valve;

said bypass valve, after permitting reduction of pump displacement at starting, being operated to and maintained in an ineffective position for permitting said pump to operate in conjunction with the pressure compensator valve as a normal variable displacement, pressure compensated pump.

5. In combination with a fluid pump comprising:

a casing, including an outlet passage and pumping mechanism having associated therewith fluid pressure actuated mechanism for varying pump displacement which is biased to the maximum displacement position, said casing having a mounting surface with passages opening thereto independently connected to the outlet passage and the displacement varying mechanism, a two-section pressure compensator valve and compensator bypass valve manifold comprising:

a first section comprising a housing having a fluid pressure actuated compensator valve shiftably mounted therein and connected thereto, a branch outlet passage and a pressure delivery passage, each passage opening to a mounting surface on the housing, said compensator valve being biased to a position closing communication between said passages and being operable at pump outlet pressure relatively higher than required to operate the displacement varying mechanism to connect said passages, said housing being removably mountable on the pump casing with the correlated passage openings on the respective mounting surfaces of the housings registering with each other to provide a variable displacement, pressure compensated pump;

a second section comprising a housing having opposed mounting surfaces, a fluid pressure actuated compensator bypass valve shiftably mounted therein and connected thereto a branch outlet passage and a pressure delivery passage, each of which opens to the opposed mounting surfaces, said housing being removably mountable on the pump casing in place of the first section housing and the first section housing being mounted on the remaining opposed mounting surface of the second section housing with the correlated passage openings on the mounting surfaces of the casing and two housing sections registering with each other, the bypass valve being biased to a position connecting the branch outlet passage to the pressure delivery passage for directly connecting the pump outlet to the variable displacement mechanism at starting of said pump and reducing displacement thereof at a pressure lower than the operating pressure of the compensator control valve, and said bypass valve being operable after pump starting to a position closing direct communication between said passages and permitting the pump to operate in conjunction with the compensator control valve as a normal variable displacement, pressure compensated pump.

6. In a hydraulic power transmission system having a fluid motor connected to a load device for driving the same and a directional control valve of the closed-center type hydraulically connected to said motor for controlling the operation thereof:

a fluid pump, including fluid pressure actuated displacement varying mechanism, having an outlet connected to the directional control valve said mechanism being biased to the maximum displacement position;

a prime mover for driving the pump, including selectively operable start and stop means;

a pressure compensator control valve hydraulically connected to the outlet side of the pump and to the displacement varying mechanism biased to a position closing communication therebetween and operable at pump outlet pressure relatively higher than required to operate the displacement varying mechanism for opening communication therebetween;

a compensator bypass control valve also hydraulically connected to the outlet side of the pump and the displacement varying mechanism ahead of such connections to the compensator control valve, said bypass valve being biased to a position forming a direct communication between said outlet and displacement varying mechanism for reducing pump displacement at starting of the pump, with the directional control valve in the closed-center position, at a pressure lower than required to operate the compensator control valve;

said bypass valve being operable upon increase of pressure, after starting of the pump, to another position closing direct communication between the outlet and said displacement varying mechanism, and being retained in said other ineffective position for permitting the pump to operate in conjunction with the pressure compensator valve as a normal variable displacement, pressure compensated pump.

7. In a hydraulic power transmission system having a fluid motor connected to a load device for driving the same and a directional control valve hydraulically connected to said motor for controlling the operation thereof:

a fluid pump, including fluid pressure actuated displacement varying mechanism, having an outlet connected to the directional control valve, said mechanism being biased to the maximum displacement position;

a prime mover for driving the pump, including selectively operable start and stop means;

a pressure compensator control valve hydraulically connected to the outlet side of the pump and to the displacement varying mechanism biased to a position closing communication therebetween and operable at pump outlet pressure relatively higher than required to operate the displacement varying mechanism for opening communication therebetween;

a compensator bypass control valve also hydraulically connected to the outlet side of the pump and the displacement varying mechanism, said bypass valve being biased to a position forming a direct communication between said outlet and displacement varying mechanism for reducing pump displacement at starting of the pump at a pressure lower than required to operate the compensator control valve;

said bypass valve being operable upon increase of pressure, after starting of the pump, to another position closing direct communication between the outlet and said displacement varying mechanism, and being retained in said other ineffective position for permitting the pump to operate in conjunction with the pressure compensator valve as a normal variable displacement, pressure compensated pump.

References Cited by the Examiner

UNITED STATES PATENTS

| 3,106,057 | 10/1963 | Manning et al. | 103—162 |
| 3,116,595 | 1/1964 | Kent et al. | 103—162 |
| 3,153,899 | 10/1964 | Budzich et al. | 103—162 |
| 3,203,165 | 8/1965 | Parr | 60—18 |

MARK NEWMAN, *Primary Examiner.*

R. M. VARGO, *Assistant Examiner.*